(12) United States Patent
Klemin et al.

(10) Patent No.: US 8,004,991 B1
(45) Date of Patent: Aug. 23, 2011

(54) METHOD AND SYSTEM FOR PROCESSING NETWORK INFORMATION

(75) Inventors: Bruce A. Klemin, Rocklin, CA (US);
Inwhan Choi, Santa Clara, CA (US);
Derek Rhode, Auburn, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 344 days.

(21) Appl. No.: 11/548,421

(22) Filed: Oct. 11, 2006

(51) Int. Cl.
*H04L 12/26* (2006.01)
(52) U.S. Cl. .................. 370/236; 370/235; 709/235
(58) Field of Classification Search .............. None
See application file for complete search history.

(56) References Cited

U.S. PATENT DOCUMENTS

| | | | | |
|---|---|---|---|---|
| 5,517,488 A | * | 5/1996 | Miyazaki et al. | 370/225 |
| 5,844,890 A | * | 12/1998 | Delp et al. | 370/230 |
| 6,044,061 A | * | 3/2000 | Aybay et al. | 370/230 |
| 6,078,564 A | * | 6/2000 | Lakshman et al. | 370/235 |
| 6,092,115 A | * | 7/2000 | Choudhury et al. | 709/235 |
| 6,304,552 B1 | * | 10/2001 | Chapman et al. | 370/232 |
| 6,765,906 B1 | * | 7/2004 | Suzuki | 370/389 |
| 6,956,818 B1 | * | 10/2005 | Thodiyil | 370/230 |
| 7,231,425 B1 | * | 6/2007 | Charny et al. | 709/205 |
| 2002/0163885 A1 | * | 11/2002 | Assa et al. | 370/230.1 |
| 2005/0243847 A1 | * | 11/2005 | Bitar et al. | 370/412 |
| 2007/0174529 A1 | * | 7/2007 | Rodriguez et al. | 710/240 |

* cited by examiner

*Primary Examiner* — Huy Vu
*Assistant Examiner* — James P Duffy
(74) *Attorney, Agent, or Firm* — Klein, O'Neill & Singh, LLP (57) ABSTRACT

Method and system for processing TCP segments is provided. The method includes assigning a TCP connection to a queue; and assigning a maximum burst size for the TCP connection; wherein a queue establishes a priority for the TCP connection and the priority is based on a maximum transmission rate assigned to the queue. The system includes a host system that establishes a network connection via a network adapter; wherein a host application sets a byte count and a time interval value for at least two queues that have different priority to transmit TCP segments; assigns a TCP connection to a queue; and assigns a maximum burst size for the TCP connection.

16 Claims, 7 Drawing Sheets

METHOD AND SYSTEM FOR PROCESSING NETWORK INFORMATION

BACKGROUND

1. Field of the Invention

The present invention relates to computer networks, and more particularly, to processing network information.

2. Background of the Invention

Computer networking is common today. Computer networking allows users to share information regardless of where they are located.

Network communication typically use standard protocols that have a layered structure. Typically, each layer performs a certain function. Transmission Control Protocol/Internet Protocol (TCP/IP) provides one such standard protocol, incorporated herein by reference in their entirety.

TCP/IP although commonly used, has some disadvantages. For example, TCP/IP does not provide a mechanism for sharing bandwidth of a network link between multiple connections. TCP attempts send data based on four factors: (a) Maximum rate of a network link; (b) amount of data that needs to be sent; (c) a receiving network node's advertised window (i.e. the amount of data a receiving node can accept) and (d) a network congestion window. The congestion window is based on overall network congestion.

TCP does not have any knowledge of different levels of priority between different TCP connections. A connection with lower priority may consume more bandwidth of a shared link than a higher priority. This can cause problems. For example, at a given time there may be a TCP connection for a file transfer operation and a "video streaming" operation. The file transfer operation for data back up may have lower priority than the request for video streaming. The video streaming operation may have stringent real-time latency requirements compared to the file transfer operation. However, the file transfer connection may consume more bandwidth than the video streaming connection, which may cause undesirable latency in the video streaming operation.

Typically, TCP lowers the size of its congestion window to react to packet drops, which are assumed to occur due to network congestion. Policies in network switches and routers (for example, random early discard of packets (RED)) cause TCP nodes to decrease transmission rates after a packet drops and then increase the rate until the next packet drop. This is not very efficient because a lost packet incurs latency and hence negatively impacts overall data throughput.

Therefore, there is a need for a system and method for optimally processing network connections.

SUMMARY OF THE INVENTION

In one aspect of the present invention, a method for processing TCP segments is provided. The method includes assigning a TCP connection to a queue; and assigning a maximum burst size for the TCP connection; wherein a queue establishes a priority for the TCP connection and the priority is based on a maximum transmission rate assigned to the queue.

In another aspect of the present invention, a system for processing TCP segments is provided. The system includes a host system that establishes a network connection via a network adapter; wherein a host application sets a byte count and a time interval value for at least two queues that have different priority to transmit TCP segments; assigns a TCP connection to a queue; and assigns a maximum burst size for the TCP connection.

In yet another aspect of the present invention, a network adapter coupled to a host system is provided. The network adapter includes a queue generator that generates at least two queues that have different priority for processing TCP segments, and a host application sets a byte count and a time interval value for the two queues, assigns a TCP connection to a queue; and assigns a maximum burst size for the TCP connection; and a byte counter for each queue, maintains a byte count to control an amount of data that each queue is permitted to send within a time interval; and the byte counter notifies a control module when a queue has transmitted an amount of permitted data within the time interval.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION

To facilitate an understanding of the adaptive aspects of the present invention, the general architecture and operation of a network system/host system/adapter will be described. The specific architecture and operation of the preferred embodiment will then be described with reference to the general architecture.

Figure 1A:
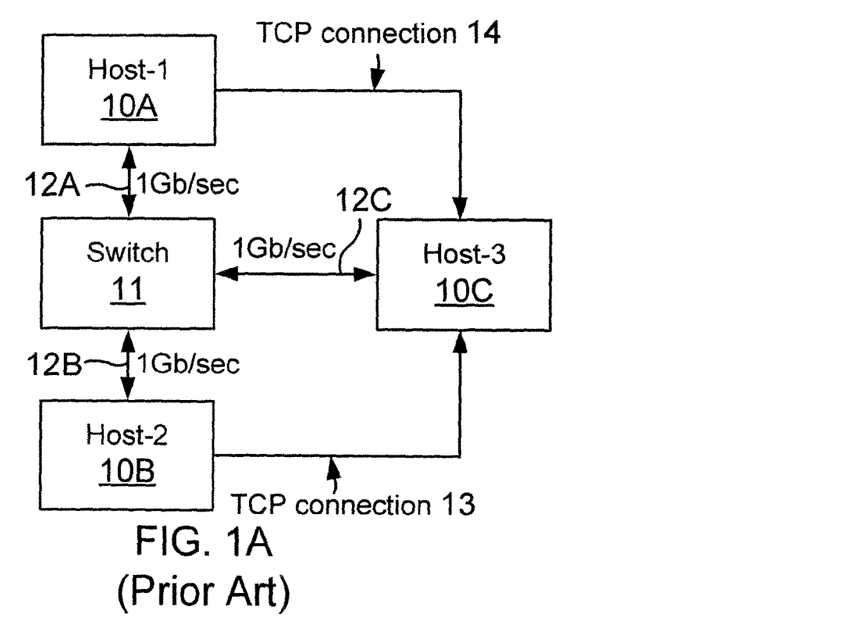
FIG. 1A shows an example of various TCP connections sharing a bandwidth link.

FIG. 1A illustrates shortcomings of standard TCP connection handling techniques. Host computing systems 10A, 10B and 10C are connected to each other via network switch 11 and network links 12A, 12B and 12C, respectively. Network links 12A-12C in this example are each 1-gigabit per second ("Gb/s" or "G").

Host 10A sends data to host 10C via connection 14 and Host 10B sends data to host 10C via connection 13. If each link transmits at the maximum rate (1 GB/s) it will cause congestion. This will result in packets being dropped, which will cause latency and reduce the overall effective bandwidth. The adaptive aspects of the present invention solve these problems.

Figure 1B:
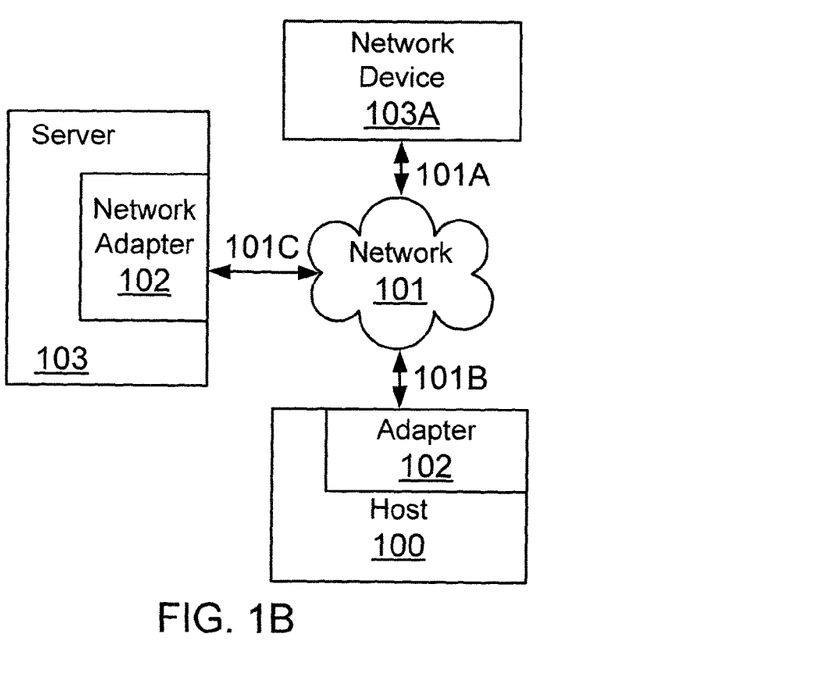
FIG. 1B shows a network system, according to one aspect of the present invention.

FIG. 1B shows a top-level block diagram for a network system that includes a host computing system 100 with a network adapter 102. Host system 100 can communicate with a network device 103A and server 103 via network 101. Links 101A, 101B and 101C facilitate network communication using TCP/IP. Links 101A, 101B and 101C may operate at different transmission rates, for example, 100M, 1G, 10G and others.

Figure 1C:
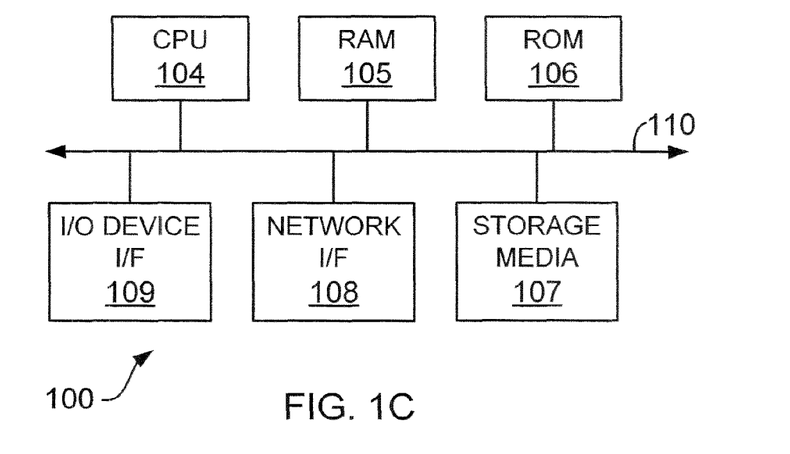
FIG. 1C shows computer system architecture according to one aspect of the invention.

FIG. 1C shows an example of an architecture used by host computing system (or host) 100. Host 100 includes a central processing unit (CPU) 104 that is coupled to a system bus 110. CPU 104 may be an Intel® based microprocessor or any other type of processor that can execute computer-executable process steps. Storage media 107 stores operating system program files, application program files, and other files. Some of these files are stored using an installation program. For example, CPU 104 executes computer-executable process steps of an installation program so that CPU 104 can properly execute the application program.

A random access main memory ("RAM") 105 also interfaces to computer bus 110 to provide CPU 104 with access to memory. When executing stored computer-executable process steps, CPU 104 stores and executes the process steps out of RAM 105.

Read only memory ("ROM") 106 is provided to store invariant instruction sequences such as start-up instruction sequences or basic input/output operating system (BIOS) sequences.

An I/O device(s) interface 109 allows host system 100 to use various input/output devices and peripherals. It is noteworthy that interface 109 may have plural components to interface with plural devices. Adapter interface 108 interfaces CPU 104 with adapter 102.

Figure 1D:
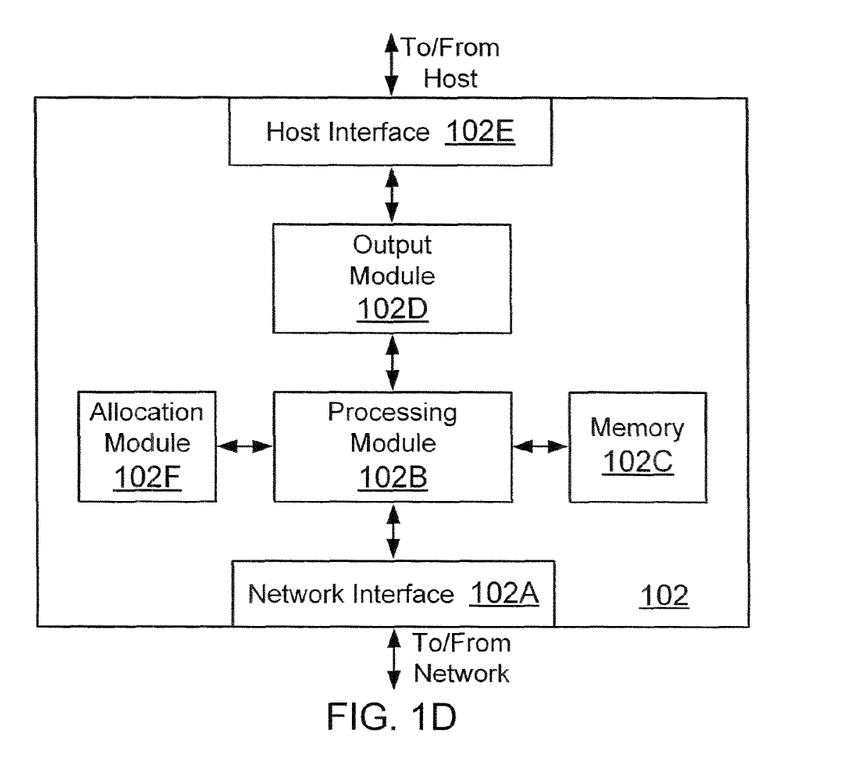
FIG. 1D shows a block diagram of a network adapter, according to one aspect of the present invention.

FIG. 1D shows an example of a network adapter ("adapter") 102, used according to one aspect of the present invention. Adapter 102 may be based on a PCI development board with a Field Programmable gate Array ("FPGA") or integrated into an Application Specific Integrated Circuit ("ASIC") with an embedded serialize/de-serializer ("SERDES") and internal programmable RAM (102C).

Adapter 102 includes a network interface 102A that receives and sends packets to a network device via a network link.

Adapter 102 also includes a processing module 102B that has access to memory 102C and performs various operations, described below. In one aspect, processing module 102B includes plural sub-modules and/or state machines (not shown) that handle protocol specific operations (for example, handling TCP connection based operations). Output module 102D facilitates data/command movement between adapter 102 and a host system (for example, 100) via host interface 102E.

Adapter 102 also includes an allocation module 102F that manages TCP connections as described below in detail with respect to FIGS. 2-6.

Figure 2A:
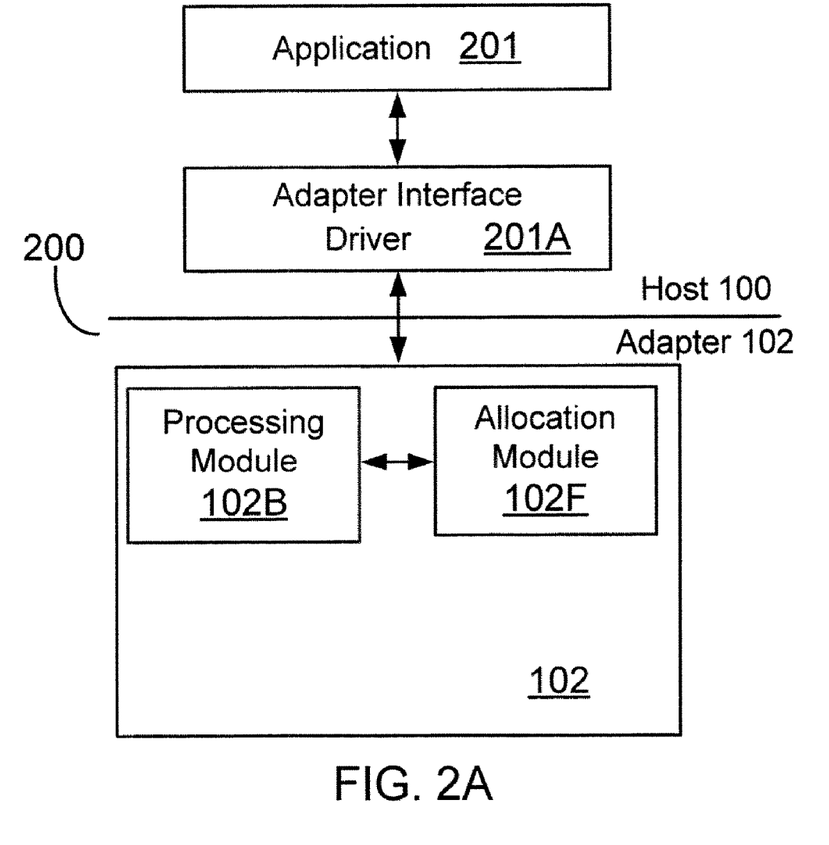
FIG. 2A shows a block diagram of a system used to process TCP segments, according to one aspect of the present invention.

FIG. 2A shows a block diagram of the overall system architecture 200 used by host system 100. System 200 may be used in Windows®, Linux®, or any other environment. System 200 includes an adapter interface driver 201A that allows host system 100 to communicate and interface with adapter 102.

Figure 2B:
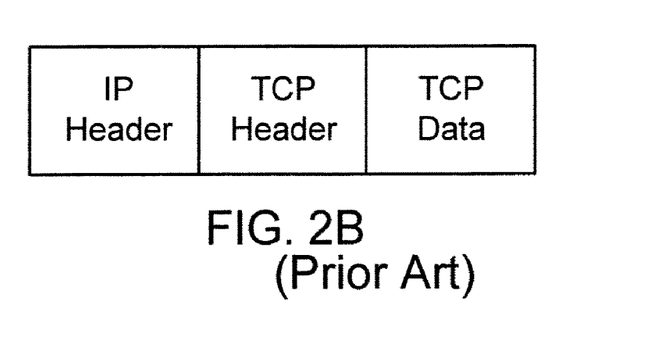
FIG. 2B shows a TCP packet according to one aspect of the present invention.
Figure 2C:
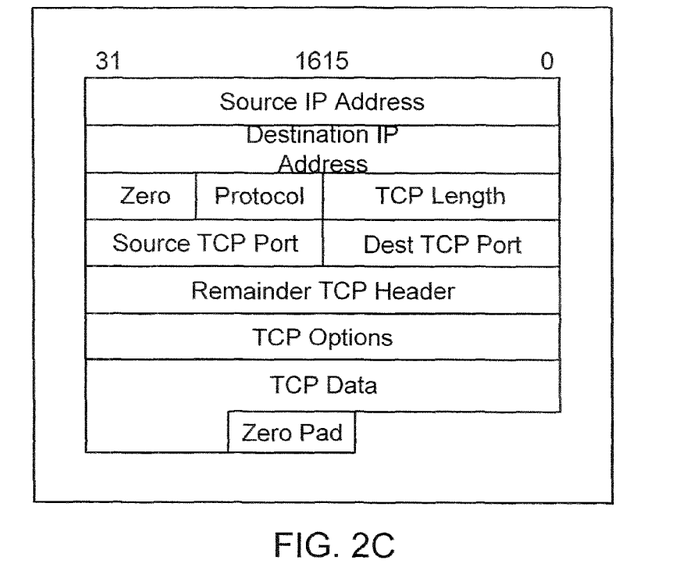
FIG. 2C shows some fields in a TCP/IP header, used according to one aspect of the present invention.
Figure 2D:
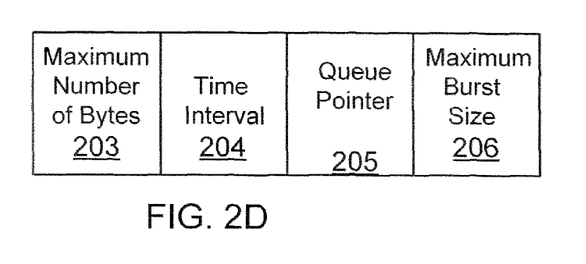
FIG. 2D shows table with fields that are added to standard TCP state information, according to one aspect of the present invention.

System 200 also includes application 201 used by a user to send TCP data segments via adapter 102. FIG. 2B shows a block diagram of TCP data encapsulated in an IP datagram and FIG. 2C shows an overview of a standard TCP/IP header. A TCP header may include various flag bits, for example, ACK flag denotes that an acknowledgement number is valid; SYN flag denotes synchronize sequence number to initiate a connection; FIN flag indicates that the packet sender has finished sending data; and RST flag resets a connection. The adaptive aspects of the present invention use additional fields than what is available in a typical TCP header to move data more efficiently, as described below with respect to FIGS. 2D and 3-5.

Application 201 is used to prioritize TCP connections. Each TCP connection is assigned a pointer (205) to a particular queue 303 (FIG. 3) (described below with respect to FIG. 3). Each queue is assigned a maximum number of bytes 203 that can be transferred within a defined time interval 204. This allocates a maximum transmission rate for a queue. A maximum burst size 206 is also assigned for each connection. This information (203-206) is in addition to standard TCP state information (see FIG. 2C for standard TCP header) that is used to transmit TCP segments for a particular connection.

Based on the foregoing, a group of TCP connections that are in the same priority class (i.e. the same queue) share a maximum aggregate transmission rate (bytes/second). The maximum transmission rate and maximum burst size are programmable and hence may be modified for different network conditions.

Figure 3:
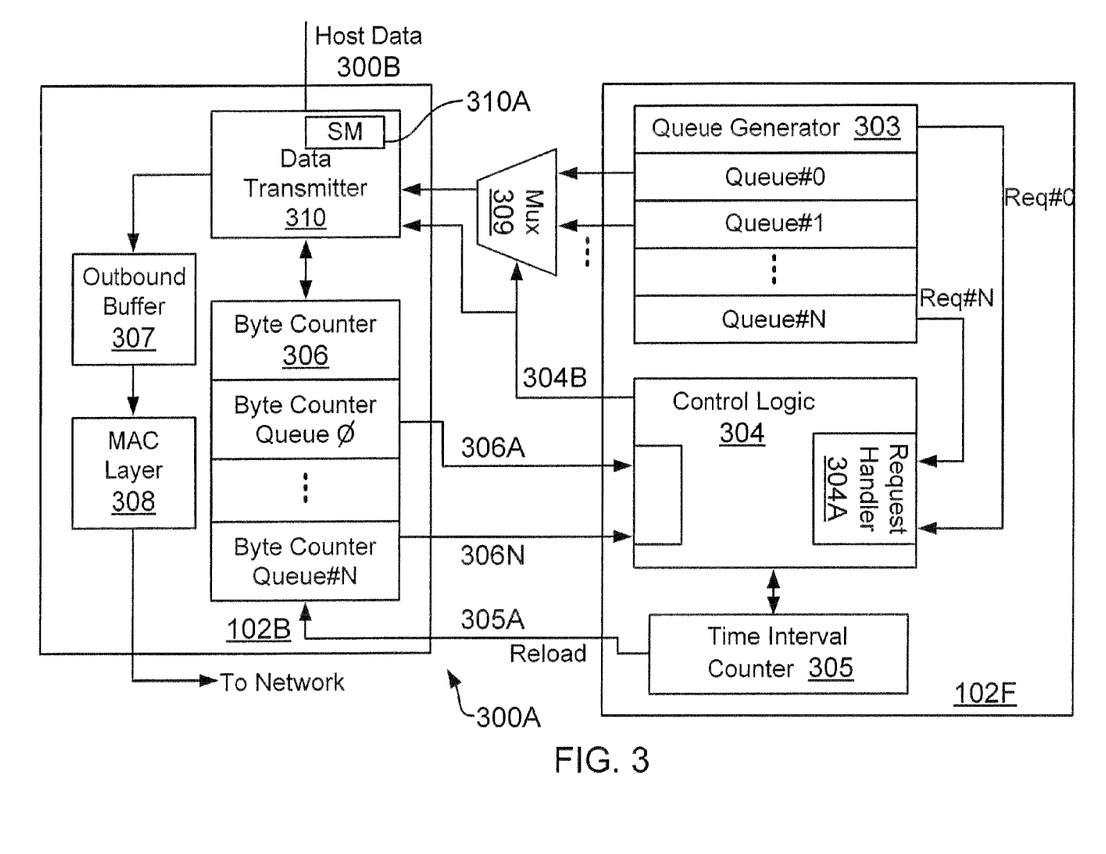
FIG. 3 is a block diagram of a processing module and allocation module for processing TCP segments, according to one aspect of the present invention.

FIG. 3 shows a block diagram of system 300A for transmitting TCP segments (may also be referred to as host data 300B) according to one aspect of the present invention. A network connection is established by host system 100 via adapter 102. Standard TCP connection information is modified by application 201, which adds fields 203, 204, 205 and 206. Based on these fields, allocation module 102F and processing module 102B move host data 300B, as described below.

Allocation module 102F includes queue generator 303, control logic 304 and time interval counter 305, according to one aspect of the present invention. Queue generator 303 maintains a number of queues and each queue include information regarding plural TCP connections. The priority of each TCP connection is based on the queue it is assigned to, and the parameters that define that queue, as described below.

Each queue is assigned a particular transfer rate, i.e. a maximum number of bytes (203) that can be transferred within a defined time interval (204). Each connection also has a maximum data burst size (206) that limits the amount of data that may be sent at any given instance.

Each queue generates a request (shown as REQ#0 for queue 0 and REQ# N for queue # N), which is sent to control logic 304. Control logic 304 includes a request handler 304A that receives queue requests and arbitrates between the requests. The arbitration is based on priority, number of bytes that may have been transmitted for a particular queue and the number of queues that may be waiting to transmit data at any given time. Once a request is granted, a grant signal 304B is sent to multiplexer ("Mux") 309. Mux 309 receives input from plural queues and selects a particular input, at any given time, based on grant signal 304B.

When a particular queue is selected to transmit data, the connection at the head of the queue is passed to data transmitter 310 in processing module 102B. Data transmitter 310 determines how much data can be sent on a particular connection based on a byte counter 306 (described below) value for that queue, maximum burst size 206 for the connection, and the amount of data that can be sent on the connection. Data transmitter 310 then moves data to an outbound memory (FIFO) 307. TCP segments for the selected connection are then sent to the network via a media access control (MAC) layer 308. The amount of data that is sent depends on the set transmission rate and the maximum burst size. Because each connection is assigned a data burst size, a single TCP connection is not able to manipulate the entire bandwidth allocated for its queue.

Processing module 102B also includes byte counter 306 for each queue. Byte counter 306 counts a number of bytes that have been transferred for a particular queue within a particular time interval.

In one aspect, byte counter 306 uses a decrement type counter. The counter decreases every time a TCP segment is transmitted. When byte counter 306 reaches zero, it indicates that all allotted data for a particular queue has been transmitted. A flag (may be designated as "Full") is set for control logic 304, which indicates this condition. Processing module 102B sets the "Full" flag using signals 306A to 306N.

In one aspect of the present invention, a time interval counter 305 maintains a time count for all queues. Counter 305 determines when an allocated time interval for the queues has expired. Once the allocated time has expired, a new time interval begins. Byte counter 306 for each queue is reloaded with a new byte size/time value via signal/command (used interchangeably) 305A.

Figure 4:
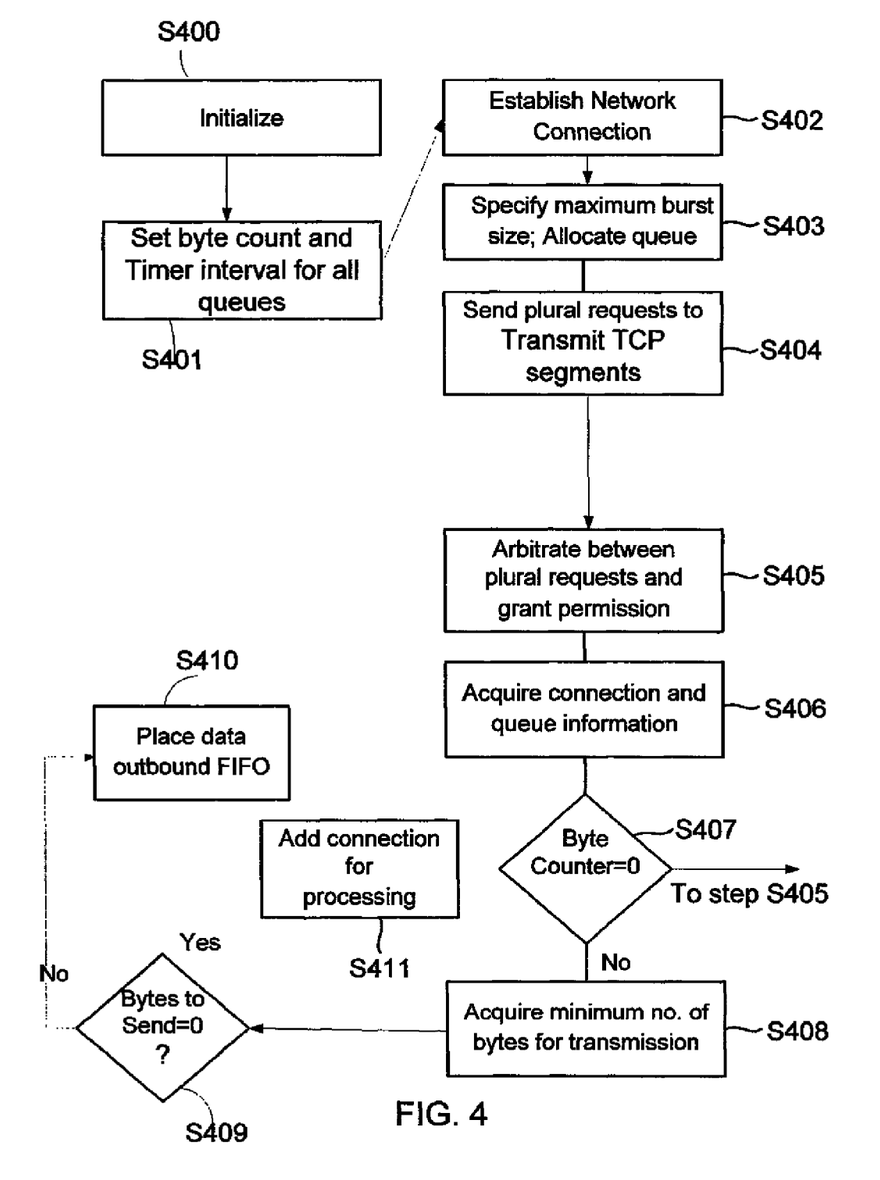
FIG. 4 shows process steps for processing network information, according to one aspect of the present invention.

FIG. 4 shows a process diagram for transmitting TCP segments, according to one aspect of the present invention. The process starts in step S400 when host system 100 is initialized. In step S401, application 201 sets a byte count value and timer interval for byte counter 306 for each queue. It is noteworthy that byte count and time interval values may be programmed/changed at any time.

In step S402, a TCP connection is established. Host system 100 establishes the TCP connection via adapter 102. Various TCP connections may be pending at any given time.

In step S403, a maximum burst size is set for the connection established in step S402 and the connection is allocated a queue. The queue for a particular TCP connection establishes relative priority for the connection. For example, if there are 3 connections assigned to queue #0 and 4 connections assigned to queue #1, when it comes to processing the connections, queue #0 connections may have priority over queue #1 connections. Step S403 is repeated every time a TCP connection is established.

In step S404, to send TCP segments for the established connection(s), plural requests are generated by plural queues. Control logic 304 receives the plural requests.

In step S405, control logic 304 arbitrates between the plural requests. The arbitration is based on whether a particular queue has transmitted all its data within the allocated time interval and overall queue priority.

In step S406, processing module 102B gets information regarding a connection that needs to be serviced. The information includes all standard TCP header information and the maximum transfer rate/maximum burst size.

In step S407, control logic 304 determines if a byte counter 306 value for a selected queue is zero. In one aspect, control logic 304 determines this by checking if the "Full" flag is set for the queue. If the flag is set, then the process moves to step S405.

If byte counter 306 value is not zero in step S407, then in step S408, data transmitter 310 acquires a minimum number of bytes that are assigned for the selected queue.

In step S409, data transmitter 310 determines if the number of bytes that need to be sent is equal to zero. If yes, then in step S411, the connection waits to be processed later. A list (not shown) may be maintained for pending TCP connections. This signifies that if a queue has already sent it's allocated amount of data, then it gets added to a list of connections that are waiting to be serviced, at any given time.

If the number of bytes that need to be sent is not equal to zero (step S409), then in step S410, TCP segments are placed in outbound FIFO 307 and then transmitted to the network.

Figure 5:
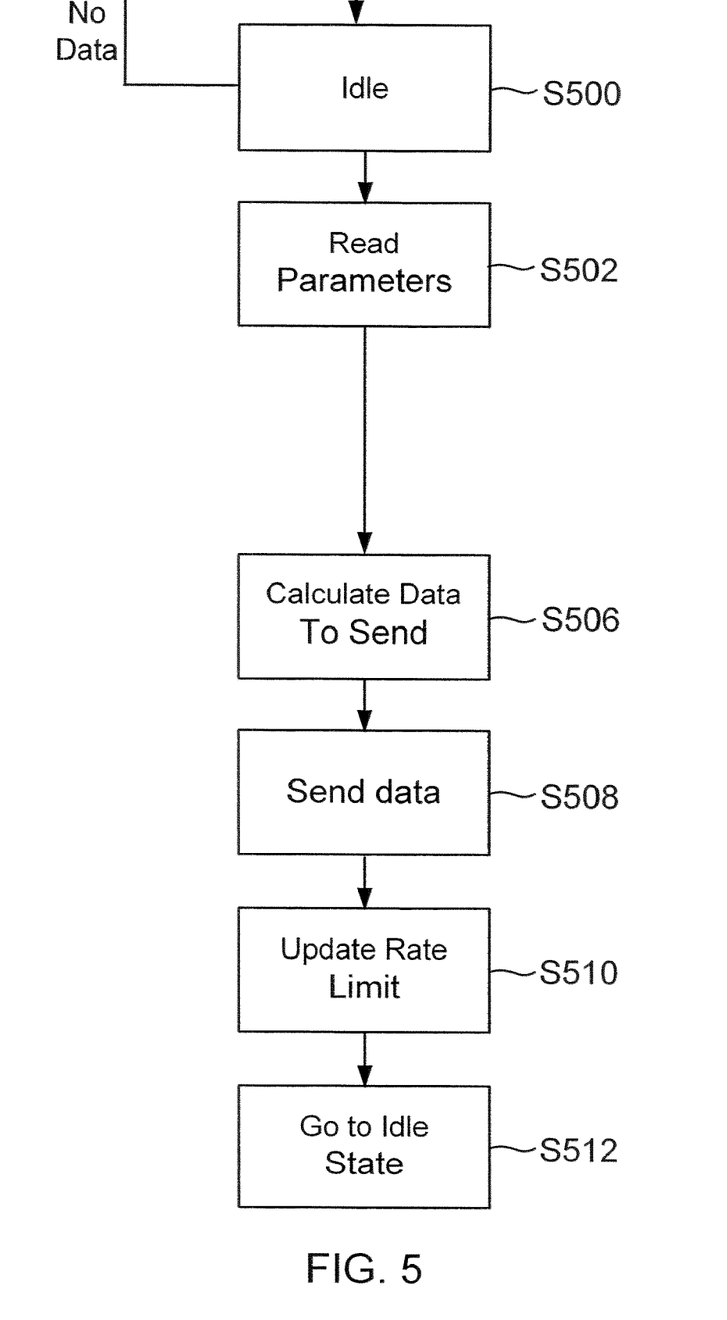
FIG. 5 shows a state machine diagram for processing TCP segments, according to one aspect of the present invention.

FIG. 5 illustrates a state machine diagram for allocating priority and bandwidth to transmit TCP segments in processing module 102B, according to one aspect of the present invention. State machine 310A may be located in module 310 or anywhere else in adapter 102.

When there are no TCP connections to be worked on, state machine 310A stays idle (Step S500). In the step S502, state machine 310A reads a queue number and a maximum burst size for a TCP connection that needs to be processed.

In step S506, state machine 310A determines the amount of data that can be sent. This is based on TCP send window (snd_wnd, a standard TCP parameter), cwnd (congestion window, a standard TCP window), bytes2send (i.e. the number of bytes remaining for the connection, a standard TCP parameter); and a maximum data burst size and a byte counter 306 value for the queue associated with the connection.

Thereafter, data is sent in step S508. In step S510, byte counter 306 is updated (if needed). This may be achieved by subtracting an amount of data that has been sent in step S508. In step S512, state machine 310A goes back to Idle state.

In one aspect of the present invention, although separate modules for allocating and processing priority classes and maximum transmission rates have been shown, it is within the scope of the present invention to have a single module performing allocation module and processing module functions.

In one aspect of the present invention, by limiting maximum burst size for a particular TCP connection alleviates buffering requirements at intermediate nodes, for example, in switches and routers.

In another aspect of the present invention, by allocating transmission rates and burst size, allows bandwidth/link to be shared by multiple connections.

In yet another aspect of the present invention, useful information is added to standard TCP connection state information (transmission rate/burst size). This allows a group of connections in a same priority class to efficiently share bandwidth.

In yet another aspect of the present invention, priority/transmission rate/burst sizes are programmable depending on network layout and conditions.

Although the present invention has been described with reference to specific embodiments, these embodiments are illustrative only and not limiting. Many other applications and embodiments of the present invention are apparent in light of this disclosure.

The invention claimed is:

1. A method for transmitting TCP segments from a host computing system via a network adapter, comprising:
   (a) maintaining a plurality of queues at the network adapter for storing information regarding a plurality of TCP connections; wherein each queue is assigned a configurable transmission rate that defines a maximum amount of information that the queue is permitted to transfer on behalf of a TCP connection from among the plurality of TCP connections within a set time interval;

(b) assigning each TCP connection to a queue from among the plurality of queues; wherein a priority for each TCP connection is established by a priority of the queue to which it is assigned and if more than one TCP connection is assigned to a same queue then the more than one TCP connection share the transmission rate for the same queue;

(c) assigning a maximum burst size for each TCP connection;

wherein the maximum burst size limits an amount of data that is sent on behalf of each TCP connection at any given instance; and wherein for transmitting TCP segments, the transmission rate, the set time interval and the maximum burst size for each TCP connection is stored as connection information in addition to a standard TCP header for each TCP connection, after each TCP connection has been established;

(d) generating a plurality of requests for transmitting TCP segments; wherein a control module receives and arbitrates between the plurality of requests and selects one of the plurality of requests based on queue priority, an amount of data each queue may have already sent before a request and a number of queues that are waiting to transmit information when the control module arbitrates between the plurality of requests;

(e) maintaining a transfer count for each queue for controlling an amount of information that each queue is permitted to send within the set time interval; and (f) notifying the control module after a queue selected in step (d) has transmitted the amount of permitted information within the set time interval.

2. The method of claim 1, wherein a byte counter for each of the plurality of queues maintains a byte count, and a time interval counter maintains a time count for each queue that is transmitting TCP segments at any given time.

3. The method of claim 1, wherein if a queue has transmitted all data within the set time interval or if the set time interval has expired, then the queue waits to transmit TCP segments.

4. The method of claim 1, wherein a host application executed by the host system sets a byte count value and a time interval value for each queue, assigns each TCP connection to a queue and assigns a maximum burst size for each connection.

5. The method of claim 1, wherein the host system establishes a network connection to send and receive information.

6. A system for network communication, comprising:
a computing system; and
a network adapter for transmitting and receiving network information;
wherein the network adapter includes:
(a) logic for maintaining a plurality of queues for storing information regarding a plurality of network connections;
wherein each of the plurality of queues is assigned a configurable transmission rate that defines a maximum amount of information that the queue is permitted to transfer on behalf of a network connection from among the plurality of network connections within a set time interval;
wherein each of the plurality of network connections is assigned to at least one queue and a priority for each network connection is established by a priority of the queue to which each of the network connection is assigned and if more than one network connection are assigned to a same queue then the more than one network connections share the transmission rate for the same queue;

wherein a maximum burst size is assigned to each network connection to limit an amount of data that is sent on behalf of each of the network connection at any given time; and wherein for transmitting network information, the transmission rate, the set time interval and the maximum burst size for each network connection is stored as connection information in addition to a standard network header for each network connection, after each network connection has been established;

(b) control logic that receives a plurality of requests from the plurality of queues to transmit information; wherein the control logic arbitrates between the plurality of requests and selects one of the plurality of requests based on queue priority, an amount of data each queue may have already sent before a request and a number of queues that are waiting to transmit information when the control logic arbitrates between the plurality of requests; and (c) logic for maintaining a transfer count for each of the plurality of queues for controlling an amount of information that each queue is permitted to send within the set time interval and notifying the control logic when a selected queue has transmitted the amount of permitted information within the set time interval.

7. The system of claim 6, wherein a byte counter for each queue maintains a byte count to control an amount of information that each queue is permitted to send and notifies the control logic when a queue has transmitted the amount of permitted information.

8. The system of claim 6, wherein a host application sets a byte count and a time interval value for each queue, assigns a network connection to a queue and assigns a maximum burst size for the connection.

9. The system of claim 6, wherein a queue waits to transmit information after the queue has transmitted all information within the set time interval or if the set time interval for the queue has expired.

10. The system of claim 6, wherein the host system establishes a network connection via the network adapter to send and receive network information.

11. A method for transmitting network information via a network adapter, comprising:
(a) maintaining a plurality of queues at the network adapter for storing information regarding a plurality of network connections;
wherein each queue is assigned a configurable transmission rate that defines a maximum amount of information that the queue is permitted to transfer on behalf of a network connection from among the plurality of network connections within a set time interval;
(b) assigning each network connection to at least one queue; wherein a priority for each network connection is established by a priority of the queue to which it is assigned and if more than one network connection is assigned to a same queue then the more than one network connections share the transmission rate for the same queue;
(c) assigning a maximum burst size for each network connection;
wherein the maximum burst size limits an amount of information sent or each network connection at any given instance; and wherein for transmitting network information the transmission rate, the set time interval and the maximum burst size for each network connection is stored as connection information in addition to a standard network header for each network connection, after each network connection has been established;

(d) generating a plurality of requests to transmit network information;

wherein a control module receives the plurality of requests from the plurality of queues, arbitrates between the plurality of requests and selects one of the plurality of requests based on queue priority, an amount of data each queue may have already sent before a request and a number of queues that are waiting to transmit information when the control logic arbitrates between the plurality of requests;

(e) maintaining a transfer count for each queue for controlling an amount of information that each queue is permitted to send within the set time interval; and (f) notifying the control module when the selected queue from step (d) has trans-miffed the amount of permitted information within the set time interval.

12. The method of claim 11, wherein a byte counter for each of the plurality of queues tracks an amount of information that has been transferred within the set time interval.

13. The method of claim 11, wherein a time interval counter maintains a time count for each queue that transmits network information.

14. The method of claim 11, wherein a queue waits before it is permitted to transmit network information, if the queue has transmitted all network information within the set time interval or if the set time interval has expired.

15. The method of claim 11, wherein a host application executed by a host system coupled to the network adapter sets a byte count value and a time interval value for each queue, assigns a network connection to a queue and assigns a maximum burst size for each connection.

16. The method of claim 11, wherein a host system coupled to the network adapter establishes a network connection to send and receive network information.

* * * * *

UNITED STATES PATENT AND TRADEMARK OFFICE
CERTIFICATE OF CORRECTION

| | | |
|---|---|---|
| PATENT NO. | : 8,004,991 B1 | Page 1 of 1 |
| APPLICATION NO. | : 11/548421 | |
| DATED | : August 23, 2011 | |
| INVENTOR(S) | : Bruce A. Klemin et al. | |

It is certified that error appears in the above-identified patent and that said Letters Patent is hereby corrected as shown below:

In column 1, line 21, after "attempts" insert -- to --.

In column 8, line 66, in Claim 11, delete "or" and insert -- for --, therefor.

In column 9, line 20, in Claim 11, delete "trans-miffed" and insert -- transmitted --, therefor.

Signed and Sealed this
Eighteenth Day of October, 2011

David J. Kappos
*Director of the United States Patent and Trademark Office*